US012230930B2

(12) United States Patent
Romanini

(10) Patent No.: US 12,230,930 B2
(45) Date of Patent: Feb. 18, 2025

(54) ELECTRIC CONNECTION DEVICE

(71) Applicant: ZECA S.P.A., Feletto (IT)

(72) Inventor: Fabrizio Romanini, Feletto (IT)

(73) Assignee: ZECA S.P.A., Feletto (IT)

( * ) Notice: Subject to any disclaimer, the term of this patent is extended or adjusted under 35 U.S.C. 154(b) by 2 days.

(21) Appl. No.: 17/919,250

(22) PCT Filed: Apr. 9, 2021

(86) PCT No.: PCT/IT2021/050097
§ 371 (c)(1),
(2) Date: Oct. 15, 2022

(87) PCT Pub. No.: WO2021/210032
PCT Pub. Date: Oct. 21, 2021

(65) Prior Publication Data

US 2023/0163544 A1 May 25, 2023

(30) Foreign Application Priority Data

Apr. 17, 2020 (IT) ........................ 102020000008098

(51) Int. Cl.
*H01R 39/64* (2006.01)
*H01R 39/10* (2006.01)
*H01R 39/46* (2006.01)

(52) U.S. Cl.
CPC ............. *H01R 39/64* (2013.01); *H01R 39/10* (2013.01); *H01R 39/46* (2013.01)

(58) Field of Classification Search
CPC ........ H01R 39/64; H01R 39/46; H01R 39/10; H01R 39/08; H01R 39/12; H01R 39/04; H01R 39/06
See application file for complete search history.

(56) References Cited

U.S. PATENT DOCUMENTS 7,037,126 B2 * 5/2006 Tsutsumi ............. H01R 39/643 285/119
7,811,092 B2 * 10/2010 Brown ................... H01R 39/64 439/24

FOREIGN PATENT DOCUMENTS

CN 201122783 Y 9/2008
CN 201294321 Y 8/2009
(Continued)

OTHER PUBLICATIONS

European Patent Office, International Search Report, issued in parent International Patent Application No. PCT/IT2021/050097, Jul. 16, 2021, 3 pages.

(Continued)

*Primary Examiner* — Renee S Luebke
*Assistant Examiner* — Paul D Baillargeon
(74) *Attorney, Agent, or Firm* — Danton K. Mak; Leech Tishman Fuscaldo & Lampl

(57) ABSTRACT

An electrical connection device is described which comprises a container comprising at least two seats, each seat being configured for containing an electrical connection element comprising a first contact element sliding contact element and a second sliding contact element, each connectable to a respective electric cable, and further comprising a tubular element inserted inside the container so that they can be rotated one with respect to the other, being the first sliding contact element integrally connected to the container and the second sliding contact element integrally connected to the tubular element to make a sliding contact between the contact elements.

7 Claims, 4 Drawing Sheets

(56) References Cited

FOREIGN PATENT DOCUMENTS

| | | | |
|---|---|---|---|
| EP | 0320416 | A1 | 6/1989 |
| WO | 2010/000599 | A2 | 1/2010 |

OTHER PUBLICATIONS

European Patent Office, Written Opinion of the International Searching Authority, issued in parent International Patent Application No. PCT/IT2021/050097, Jul. 16, 2021, 5 pages.

* cited by examiner

ELECTRIC CONNECTION DEVICE

CROSS-REFERENCE TO RELATED APPLICATIONS

The present Application is a national stage of International Patent Application No. PCT/IT2021/050097 titled "Electric Connection Device," filed Apr. 9, 2021, which claims priority from Italian Patent Application No. 102020000008098 titled "Electrical Connection Device," filed Apr. 17, 2020, the contents of which are incorporated herein by reference in their entirety.

BACKGROUND OF THE INVENTION

1) Field of the Invention

The present invention refers to an electrical connection device.

In particular, the invention refers to an electrical connection device of the rotating type, commonly known as a rotating joint or collector, for the electrical connection of two rotating elements.

2) Background Art

Rotating electrical connection devices used to transmit current between a fixed part and a mobile part of an equipment, for example of a machine, are known.

Such known electrical connection devices comprise a container inside which a sliding contact is inserted, formed by a fixed part and a movable part in contact with each other and each connected to respective electric cables.

These known electrical connection devices, however, are not satisfactory since they have the problem of having an excessive bulk, when it is necessary to connect a plurality of electrical cables.

Another problem of known electrical connection devices is that of ensuring good contact reliability over time, at reduced costs.

CN201122783Y discloses an electrical connection device according to the preamble of claim 1.

SUMMARY OF THE INVENTION

Object of the present invention is providing an electrical connection device which has reduced overall dimensions, especially in the longitudinal direction, and which is reliable and inexpensive.

The aforementioned and other objects and advantages of the invention, which will emerge from the following description, are achieved with an electrical connection device such as the one described in the main claim. Preferred embodiments and non-trivial variants of the present invention form the subject of the dependent claims.

It is understood that the attached claims form an integral part of the present description.

It will be immediately obvious that innumerable variations and modifications (for example relating to shape, dimensions, arrangements and parts with equivalent functionality) can be made to what is described without departing from the scope of the invention as appears from the attached claims.

BRIEF DESCRIPTION OF THE DRAWINGS

The present invention will be better described by a preferred embodiment, provided by way of non-limiting example, with reference to the attached drawings, in which.

DETAILED DESCRIPTION OF PREFERRED EMBODIMENTS

Figure 1:
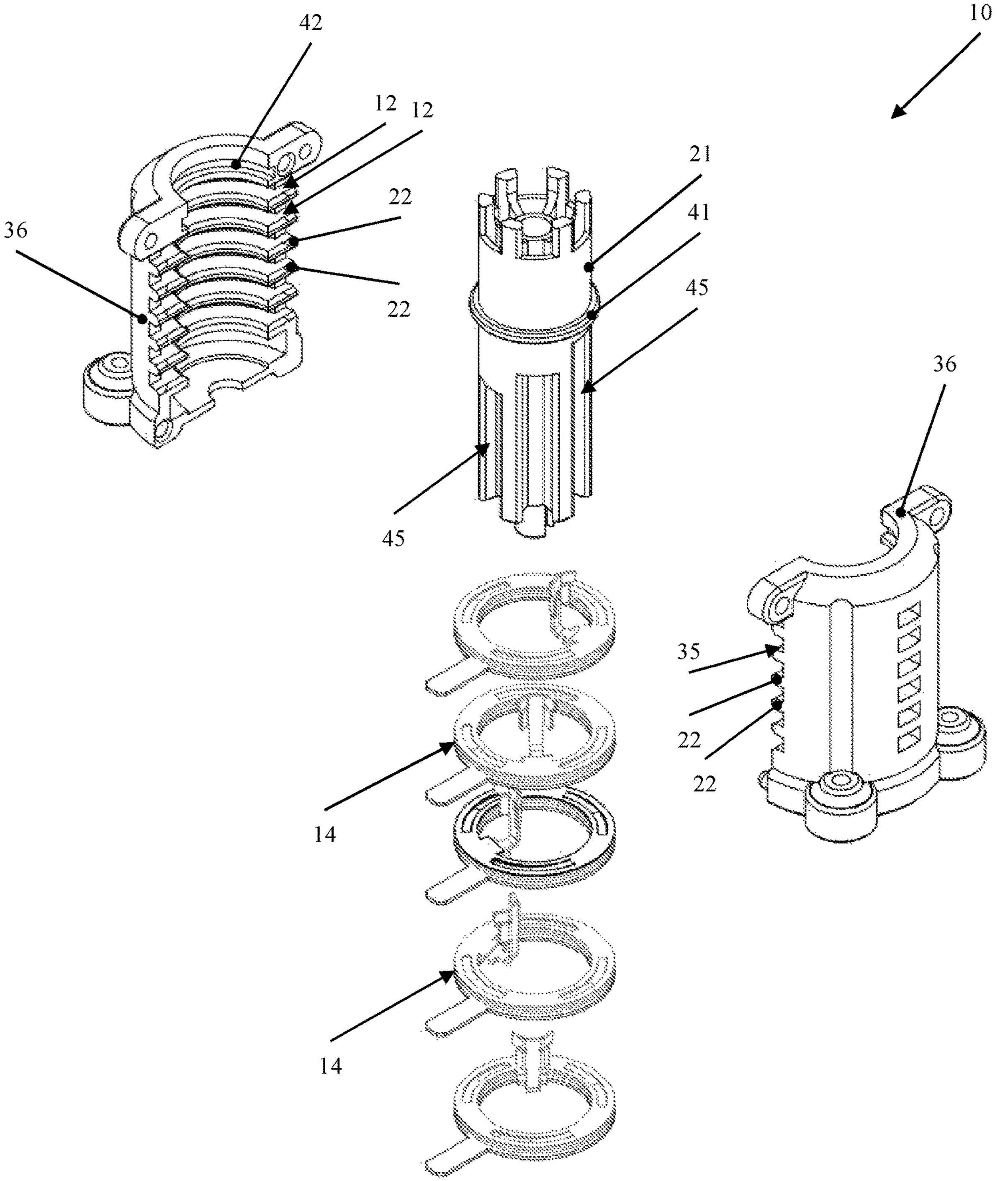
FIG. 1 shows an exploded view of an electrical connection device according to the present invention.
Figure 2:
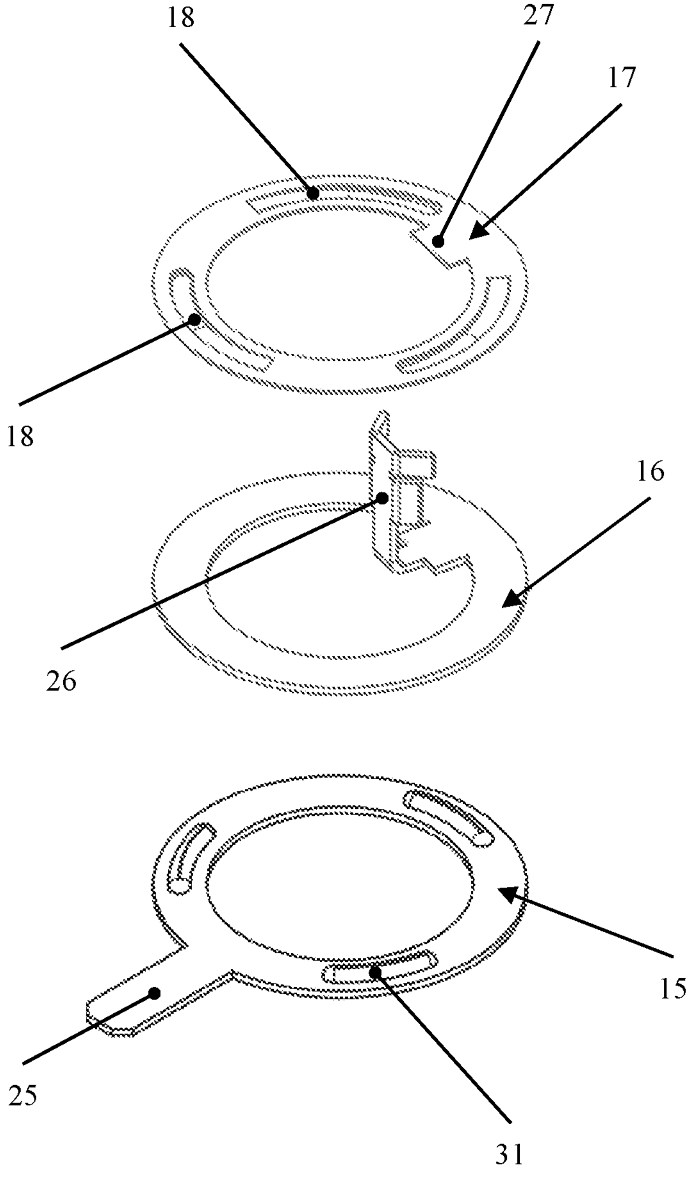
FIG. 2 shows an exploded view of a detail of an electrical connection device according to the present invention.
Figure 3:
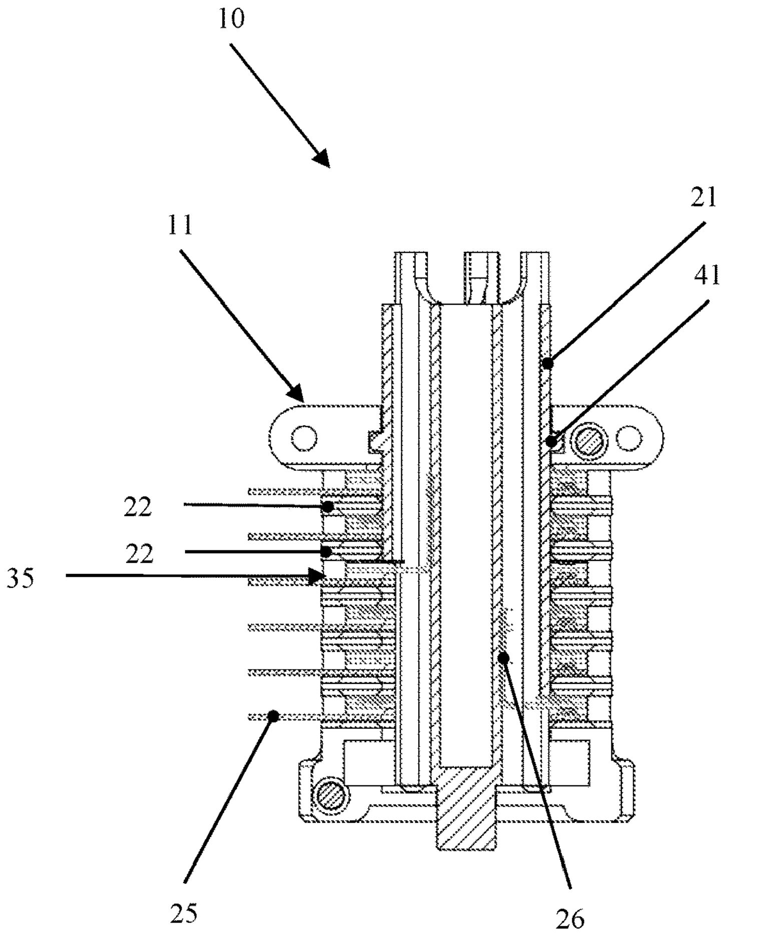
FIG. 3 shows a side sectional view of an electrical connection device according to the present invention.
Figure 4:
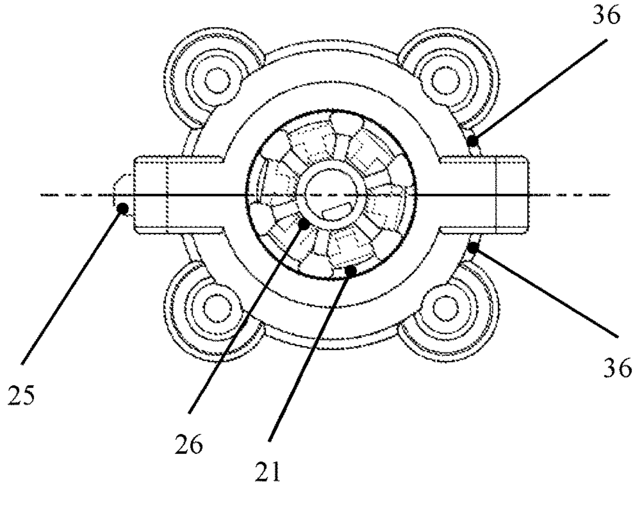
FIG. 4 shows a top view of an electrical connection device according to the present invention.
Figure 5:
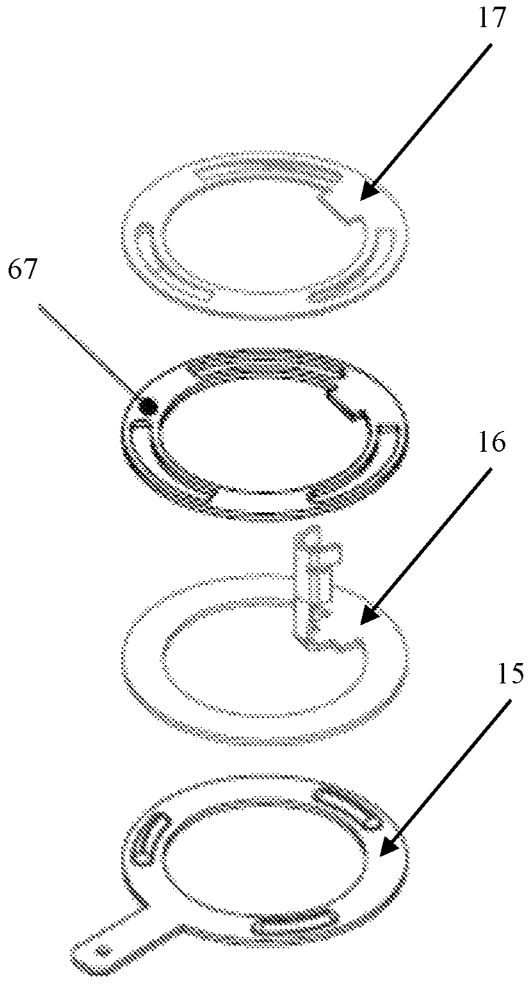
FIG. 5 shows an exploded view of a detail of an embodiment of an electrical connection device according to the present invention.

With reference to FIGS. 1-5, the electrical connection device 10 of the present invention comprises a container 11 comprising at least two seats 12, each seat 12 being configured to contain an electrical connection element 14 comprising a first sliding contact element 15 and a second sliding contact element 16, each of the sliding contact elements 15, 16 being connectable to a respective electric cable (not shown in the figures).

The electrical connection device 10 also comprises a tubular element 21 inserted inside the container 11 so that the tubular element 21 and the container 11 are rotatable relative to each other, the tubular element 21 being shaped to allow the passage of at least one electric cable connected to the electric connection element 14; preferably the tubular element 21 comprises at least one longitudinal recess 45 for the passage of an electric cable.

The first sliding contact element 15 is integrally connected to the container 11 and the second sliding contact element 16 is integrally connected to the tubular element 21, so as to rotate relative to each other to make a sliding contact between the sliding contact elements 15, 16.

Preferably, each electrical connection element 14 further comprises an elastic element 17, for example a leaf spring, configured to keep the first sliding contact element 15 and the second sliding contact element 16 in contact, for example by means of at least a protruding flap 18, for example made so as to have one end connected to the elastic element 17.

Preferably, each sliding contact element 15, 16 comprises a tab 25, 26 for connecting the sliding contact elements 15, 16 to a respective electric cable.

Preferably, the first sliding contact element 15 comprises a radial tab 25 for connection to an electric cable, which is inserted in an opening 35 made in the container 11 so as to make the first sliding contact element 15 integral with the container 11; the second sliding contact element 16 comprises an axial tab 26 for connection to an electric cable, which is inserted in the longitudinal recess 45 made in the tubular element 21 so as to make the second sliding contact element 16 integral with the tubular element 21.

Preferably, the sliding contact elements 15, 16 and the elastic element 17 have an annular shape, for example of a perforated disk, with the tubular element 21 inserted inside them and the sliding contact elements 15, 16 can be rotated on their axis and superimposed on each other so as to slide on each other when the tubular element 21 and the container 11 are made to rotate relative to each other; in a known way, the sliding contact elements 15, 16 are made of conductive material, such as known brass or bronze alloys.

In order to achieve a better electrical contact between the first sliding contact element 15 and the second sliding contact element 16, at least one contact area 31 projecting from the surface of the second sliding contact element 16 is preferably provided.

Each seat 12 comprises two walls 22 for containing an electrical connection element 14 and the openings 35 are formed between the two walls 22. Preferably, the container 11 comprises a plurality of seats 12, each containing an electrical connection element 14 inserted in the seat between the two walls 22 so as to compress the elastic element 17 to keep the first sliding contact element 15 and the second 16 sliding contact element 16 in contact; the tubular element 21 comprises a plurality of longitudinal recesses 45 for the passage of a respective electric cable.

In an embodiment of the electrical connection device 10 according to the invention, at least one seat 12 of the container 11 is configured to accommodate two electrical connection elements 14 for grounding the device 10.

Preferably, the container 11 comprises two shells 36, preferably fixed by means of fastening means, for example screws, and the openings 35 are made at the contact surface between the two shells 36.

Preferably, the tubular element 21 comprises an annular protrusion 41 configured to fit into a circular seat 42 obtained in the container 11, so as to form a guide which allows the tubular element 21 or the container 11 to rotate, one relative to the other.

In a first configuration, the electrical connection device 10 according to the invention comprises the fixed tubular element 21, to constitute a stator, and the mobile container 11, to constitute a rotor which can be connected to the mobile part of the apparatus to which the device 10 is connected.

Preferably, each elastic element 17 comprises a protrusion 27 mounted at the longitudinal tab 26 of each second sliding contact element 16 when the elastic element 17 and the sliding contact elements 15, 16 are superimposed to form the electrical connection element 14, the protrusion 27 being inserted in the longitudinal recess 45 so as to keep the elastic element 17 integral with the second sliding contact element 16 and with the tubular element 21 which do not rotate.

In the operation of the electrical connection device 10 according to the invention in the first configuration, when the movable part of the apparatus rotates, the container 11, connected to it, rotates with respect to the tubular element 21 on its longitudinal axis, dragging in its rotation the first sliding contact elements 15 connected to it by means of the respective radial tabs 25 inserted in the openings 35, thus maintaining the electrical contact between the sliding contact elements 15, 16 thanks to the action of the elastic element 17.

In a second configuration, the electrical connection device 10 according to the invention comprises the fixed container 11, to constitute a stator, and the movable tubular element 21, to constitute a rotor which can be connected to the movable part of the apparatus to which the device 10 is connected.

Preferably, each elastic element 17 comprises a protrusion (not shown in the figures) mounted at the radial tab 25 of each first sliding contact element 15 when the elastic element 17 and the sliding contact elements 15, 16 are superimposed to form the electrical connection element 14, the protrusion being inserted into the opening 35 so as to keep the elastic element 17 integral with the first sliding contact element 15 and with the container 11 which do not rotate.

In the operation of the electrical connection device 10 according to the invention in the second configuration, when the movable part of the apparatus rotates, the tubular element 21, connected to it, rotates with respect to the container 11 on its longitudinal axis, dragging in its rotation the second sliding contact elements 16 connected to it by means of the respective longitudinal tabs 26 inserted in the longitudinal recesses 45, thus maintaining the electrical contact between the sliding contact elements 15, 16 thanks to the action of the elastic element 17.

In an embodiment of the invention, the electrical connection element 14 further comprises a spacer element 67, positioned between the elastic element 17 and a sliding contact element 15, 16, preferably positioned between the elastic element 17 and the second sliding contact element 16, and configured to ensure the correct operation of the elastic element 17 so as to ensure contact between the first and the second sliding contact elements 16, 15, eliminating the play between the elements 17, 16, 15 of the electrical connection element 14.

Preferably, the spacer element 67 has an annular shape, for example of a perforated disk, and the tubular element 21 is inserted inside it; preferably the spacer element 67 is made of plastic material, for example polyamides or polyamides loaded with glass fiber, polyvinylidene fluoride or polyetherimide.

Advantageously, the electrical connection device 10 of the invention allows you to electrically connect a fixed part and a mobile part of an equipment, ensuring good contact reliability over time, with reduced dimensions and costs.

A further advantage of the electrical connection device 10 in the embodiment of the invention which comprises the spacer element, is that of ensuring the correct work of the spring, thanks to the presence of the spacer element, without it being able to be packed in any way, and at the same time guarantee the contact between the sliding contact elements, eliminating the play.

The invention claimed is:

1. An electrical connection device which comprises a container comprising at least two seats, each seat being structured and arranged to contain an electrical connection element comprising a first sliding contact element and a second sliding contact element, each connectable to a respective electric cable, the electrical connection device further comprising a tubular element inserted inside the container wherein the tubular element and the container are rotatable relative to each other, the first sliding contact element being integrally connected to the container and the second sliding contact element connected integrally to the tubular element to make a sliding contact between the first and second sliding contact elements, wherein each seat comprises two walls structured and arranged to contain the electrical connection element, wherein each electrical connection element comprises an elastic element structured and arranged to keep in contact the first sliding contact element and the second sliding contact element, wherein the sliding contact elements and the elastic element have an annular shape with the tubular element inserted inside them, wherein the first and second sliding contact elements are rotatable on their axis and the annular surfaces of the first and second sliding contact elements are superimposed on each other, so as to slide on each other when the tubular element and the container are made to rotate relative to each other.

2. The electrical connection device of claim 1, wherein each sliding contact element comprises a tab structured and arranged to connect the sliding contact elements to the respective electric cable.

3. The electrical connection device of claim 1, wherein the first sliding contact element comprises a radial tab inserted in an opening made in the container so as to make the first sliding contact element integral with the container, and wherein the second sliding contact element comprises a longitudinal tab inserted in a longitudinal recess obtained in the tubular element structured and arranged to make the second sliding contact element integral with the tubular element.

4. The electrical connection device of claim 3, wherein the container comprises two shells, and the opening is made at a contact surface between the two shells.

5. The electrical connection device of claim 1, wherein each of the at least two seats contain the electrical connection element inserted in the seat between the two walls compressing the elastic element to keep the first sliding contact element and the second sliding contact element in contact with each other.

6. The electrical connection device of claim 1, wherein the container is structured and arranged to be connected to a movable part of an apparatus and is rotatably connected to the tubular element, or the tubular element is structured and arranged to be connected to the movable part of the apparatus and is rotatably connected to the container.

7. The electrical connection device of claim 1, wherein the electrical connection element comprises a spacer element positioned between the elastic element and the second sliding contact element to ensure contact between the first sliding contact element and the second sliding contact element.

* * * * *